United States Patent
Vorobiev

(10) Patent No.: US 10,363,784 B1
(45) Date of Patent: Jul. 30, 2019

(54) TIRE TRACTION DEVICE

(71) Applicant: Vlad Vorobiev, Maple (CA)

(72) Inventor: Vlad Vorobiev, Maple (CA)

(*) Notice: Subject to any disclaimer, the term of this patent is extended or adjusted under 35 U.S.C. 154(b) by 147 days.

(21) Appl. No.: 15/682,650

(22) Filed: Aug. 22, 2017

(51) Int. Cl.
*B60C 27/04* (2006.01)
*B60C 27/20* (2006.01)
*B60C 27/02* (2006.01)

(52) U.S. Cl.
CPC .......... *B60C 27/04* (2013.01); *B60C 27/0238* (2013.01); *B60C 27/0276* (2013.01); *B60C 27/20* (2013.01)

(58) Field of Classification Search
CPC ..... B60C 27/04; B60C 27/0238; B60C 27/20; B60C 27/0276
USPC ...................................................... 152/225 R
See application file for complete search history.

(56) References Cited

U.S. PATENT DOCUMENTS

| | | | |
|---|---|---|---|
| 1,245,160 A | 11/1917 | Mulvhill | |
| 3,339,891 A | 9/1967 | Clash | |
| 4,116,254 A * | 9/1978 | Seip | B60C 27/02 152/222 |
| 5,156,695 A | 10/1992 | Martin | |
| 5,569,340 A | 10/1996 | Ulrich | |
| 5,865,916 A * | 2/1999 | Woolley | B60C 27/04 152/225 R |
| 6,053,227 A * | 4/2000 | Robeson | B60B 15/00 152/216 |
| 6,401,775 B1 | 6/2002 | Sood | |
| 6,837,286 B2 | 1/2005 | Labbe | |
| D689,014 S | 9/2013 | Cox | |
| D710,790 S | 8/2014 | O'Dell | |
| 9,636,944 B2 * | 5/2017 | Woolley | B60B 15/02 |
| 2004/0154717 A1 * | 8/2004 | Gray | B60C 11/16 152/213 R |
| 2017/0158003 A1 * | 6/2017 | Theroux | B60B 15/18 |

FOREIGN PATENT DOCUMENTS

WO 1989005378 6/1989

* cited by examiner

*Primary Examiner* — S. Joseph Morano
*Assistant Examiner* — Jean W Charleston
(74) *Attorney, Agent, or Firm* — Kyle A. Fletcher

(57) ABSTRACT

The tire traction device is configured for use with a vehicle. The tire traction device attaches to the wheel and tire of the vehicle such that the tire traction device distributes the load delivered through the load path carried by the wheel and tire of the vehicle over a greater surface area than can be provided by the wheel and tire of the vehicle alone. The distribution of the load over this greater surface increases the traction of the wheel and tire of the vehicle on supporting surfaces comprising granular materials. The tire traction device comprises a first stanchion, a second stanchion, a base plate, and a strap. The base plate increases the load distribution of the wheel and tire of the vehicle. The first stanchion, the second stanchion and the strap attach the tire traction device to the wheel and tire of the vehicle.

17 Claims, 4 Drawing Sheets

COTTER PIN

SPRING LOADED
BALL LOCK

G SNAP COLLAR

SPLIT COLLAR LOCK

THREADED CLUTCH

INTERNAL CAM LOCK

TIRE TRACTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles including vehicle tires, more specifically, a non-skid device that is temporarily attachable to a resiliently-tired wheels comprising a ground engaging plate like element.

SUMMARY OF INVENTION

The tire traction device is configured for use with a vehicle. The tire traction device is configured for use with the wheel and tire of the vehicle. The tire traction device attaches to the wheel and tire of the vehicle such that the tire traction device distributes the load delivered through the load path carried by the wheel and tire of the vehicle over a greater surface area than can be provided by the wheel and tire of the vehicle alone. The distribution of the load over this greater surface increases the traction of the wheel and tire of the vehicle on supporting surfaces comprising granular materials. The tire traction device comprises a first stanchion, a second stanchion, a base plate, and a strap. The base plate increases the load distribution of the wheel and tire of the vehicle. The first stanchion, the second stanchion and the strap attach the tire traction device to the wheel and tire of the vehicle.

These together with additional objects, features and advantages of the tire traction device will be readily apparent to those of ordinary skill in the art upon reading the following detailed description of the presently preferred, but nonetheless illustrative, embodiments when taken in conjunction with the accompanying drawings.

In this respect, before explaining the current embodiments of the tire traction device in detail, it is to be understood that the tire traction device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tire traction device.

It is therefore important that the claims be regarded as including such equivalent construction insofar as they do not depart from the spirit and scope of the tire traction device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
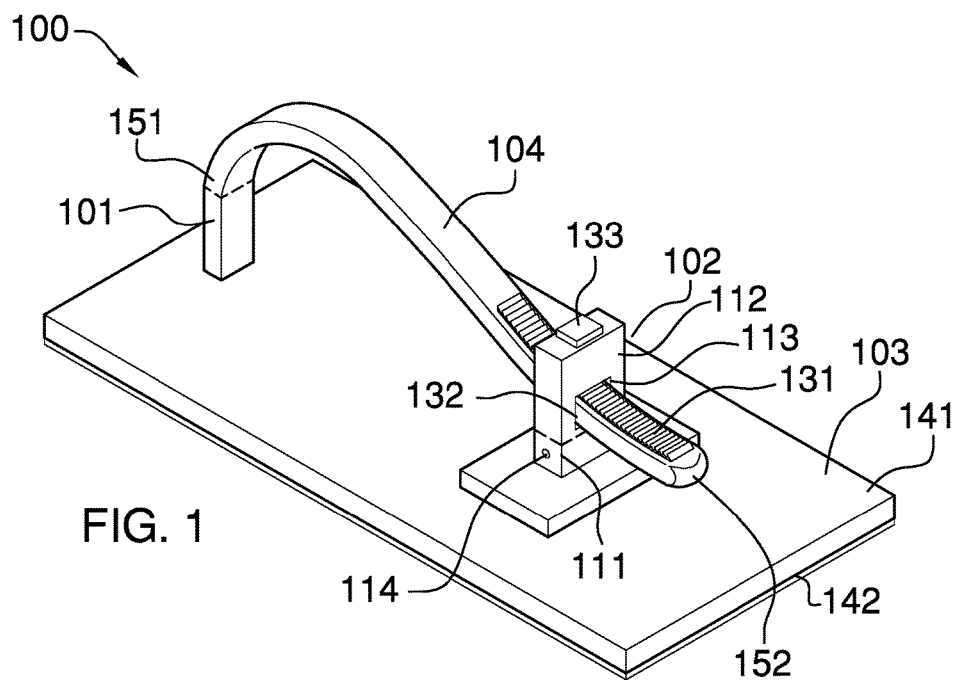
FIG. 1 is a perspective view of an embodiment of the disclosure.
Figure 2:
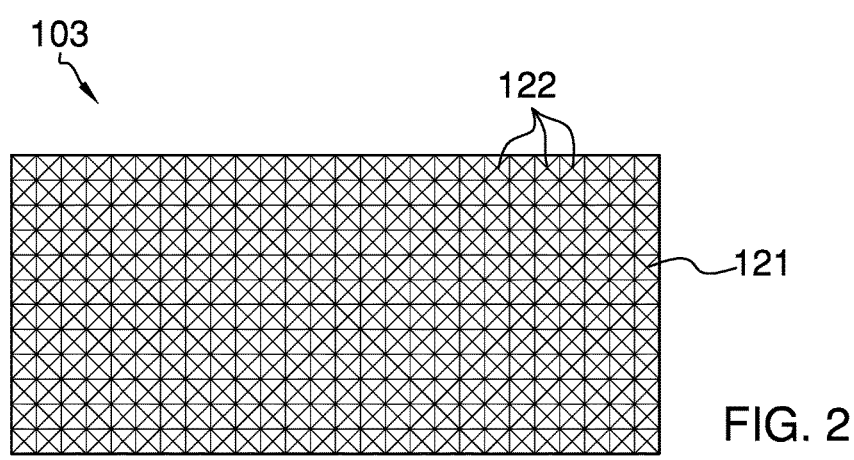
FIG. 2 is a bottom view of an embodiment of the disclosure.
Figure 3:
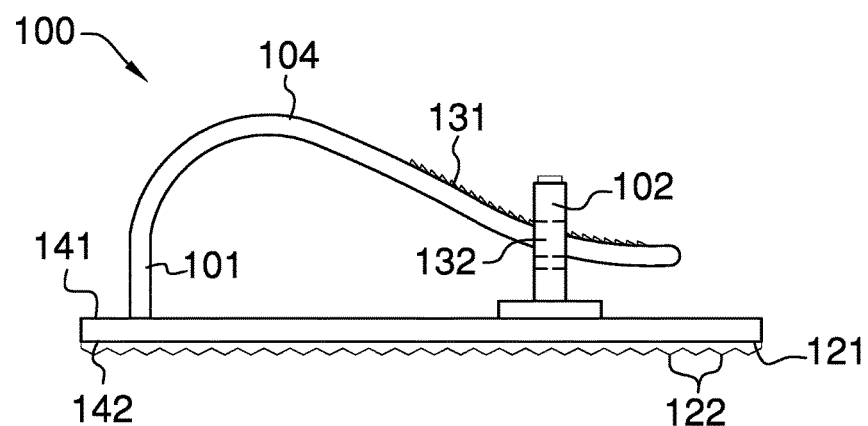
FIG. 3 is a side view of an embodiment of the disclosure.
Figure 4:
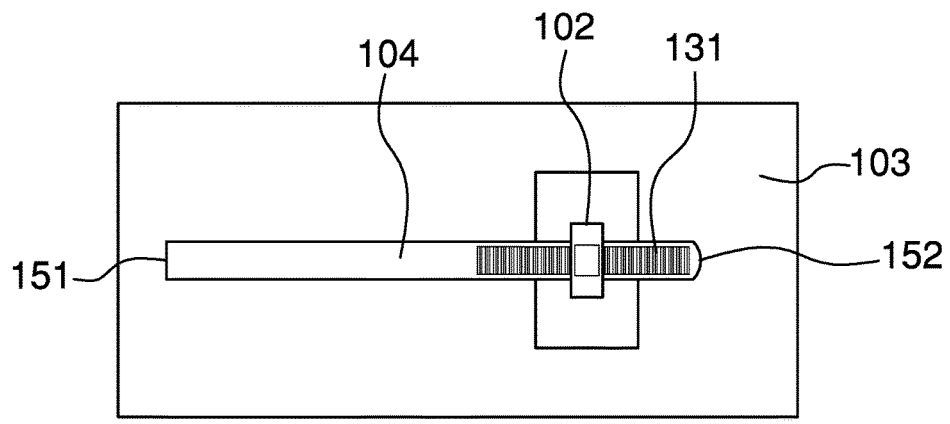
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 11.

The tire traction device 100 (hereinafter invention) is configured for use with a vehicle 161. The vehicle 161 is further defined with a wheel 162 and a tire 163. The invention 100 is configured for use with the wheel 162 and tire 163 of the vehicle 161. The invention 100 attaches to the wheel 162 and tire 163 of the vehicle 161 such that the invention 100 distributes the load delivered through the load path carried by the wheel 162 and tire 163 of the vehicle 161 over a greater surface area than can be provided by the wheel 162 and tire 163 of the vehicle 161 alone. The distribution of the load over this greater surface increases the traction of the wheel 162 and tire 163 of the vehicle 161 on a supporting surface 164 comprising granular materials.

The vehicle 161 refers to a motorized vehicle, such as an automobile, to which the invention 100 is attached. The supporting surface 164 refers to a roughly horizontal surface upon which the vehicle 161 is positioned.

The invention 100 comprises a first stanchion 101, a second stanchion 102, a base plate 103, and a strap 104. The base plate 103 increases the load distribution of the wheel 162 and tire 163 of the vehicle 161. The first stanchion 101, the second stanchion 102 and the strap 104 attach the base plate 103 to the wheel 162 and tire 163 of the vehicle 161. The base plate 103 is further defined with a medial surface 141 and a distal surface 142. The strap 104 is further defined with a first end 151 and a second end 152. The medial surface 141 is the surface of the base plate 103 that is proximal to the tire 163 during normal use of the invention 100. The distal surface 142 is the surface of the base plate 103 that is distal from the medial surface 141.

The first stanchion 101 is a cantilever prism structure that projects perpendicularly away from the medial surface 141 of the base plate 103. The first end 151 of the strap 104 permanently attaches to the free end of the first stanchion 101.

The second stanchion 102 is a cantilever prism structure that projects perpendicularly away from the medial surface 141 of the base plate 103. The second end 152 of the strap 104 removably attaches to the second stanchion 102. The second stanchion 102 is a telescopic structure. The span of the length of the second stanchion 102 from the fixed end attached to the base plate 103 to the free end of the second stanchion 102 is adjustable. The second stanchion 102 comprises a first arm 111, a second arm 112, a ratchet 113, and a detent 114.

The detent 114 connects the second arm 112 to the first arm 111. The first arm 111 is the arm of the second stanchion 102 that attaches to the medial surface 141 of the base plate 103. The first arm 111 is a hollow first prism that is further defined with an inner dimension. The second arm 112 is a second prism that is further defined with an outer dimension. The first arm 111 and the second arm 112 are geometrically similar. The outer dimension of the second arm 112 is less than the inner dimension of the first arm 111 such that the second arm 112 can be inserted into the first arm 111 in a telescopic manner. This telescopic arrangement of the second stanchion 102 allows the length of the second stanchion 102 to be adjusted by adjusting the relative position of the second arm 112 within the first arm 111.

The position of the second arm 112 relative to the first arm 111 is held in position using the detent 114. The detent 114 is a mechanical device that connects and secures the first arm 111 to the second arm 112. As shown most clearly in FIGS. 6 to 11, the detent 114 is selected from the group consisting of a cotter pin 171, a G snap collar 172, a cam lock collar 173, a threaded clutch 174, a split collar lock 175, or a spring loaded ball lock 176.

The ratchet 113 is a mechanical device that removably attaches the second end 152 of the strap 104 to the second arm 112 of the second stanchion 102. The second end 152 of the strap 104 is inserted into the ratchet 113. The ratchet 113 is a device that engages with the second end 152 of the strap 104 such that the strap 104 will only move in one direction though the ratchet 113. This arrangement allows the ratchet 113 to apply an adjustable tension to the strap 104 in a manner that allows for adjustments to be made in the attachment of the invention 100 to the wheel 162 and tire 163 of the vehicle 161. By adjusting the span of the second stanchion 102, the angle of attachment of the strap 104 to the ratchet 113 can be adjusted as is necessary to secure the invention 100 to the wheel 162 and tire 163 of the vehicle 161.

The ratchet 113 mechanism is similar in nature as the ratchet system found in a readily and commercially available cable tie. The significant difference is the inclusion of a quick release capability to allow for the detachment of the strap 104 from the second stanchion 102. The ratchet 113 comprises a pawl 131, a gear box 132, and a quick release 133.

The pawl 131 comprises a plurality of angled teeth that are formed on the second end 152 of the strap 104. The pawl 131 of the strap 104 is inserted into the gear box 132 such that the angled teeth of the pawl 131 engage the sloping teeth contained within the gear box 132. The angled teeth of the pawl 131 interact with the sloped teeth of the gear box 132 such that the strap 104 can only move in one direction through the gear box 132 until the strap 104 is released by the quick release 133.

The gear box 132 is a channel that is formed through the second arm 112 of the second stanchion 102. The gear box 132 is further fitted with a plurality of sloped teeth that are designed to engage with the pawl 131 of the strap 104 when the strap 104 is inserted into the gear box 132. The inner dimensions of the gear box 132 are designed to be adjustable. Specifically, the inner dimensions of the gear box 132 can be increased such that the pawl 131 of the strap 104 can be disengaged and removed from the gear box 132.

The quick release 133 is a lever mechanism that is used to increase and decrease the inner dimensions of the gear box 132. The design and use of lever mechanisms to change the relative size of an object is well known and documented in the mechanical arts.

Figure 5:
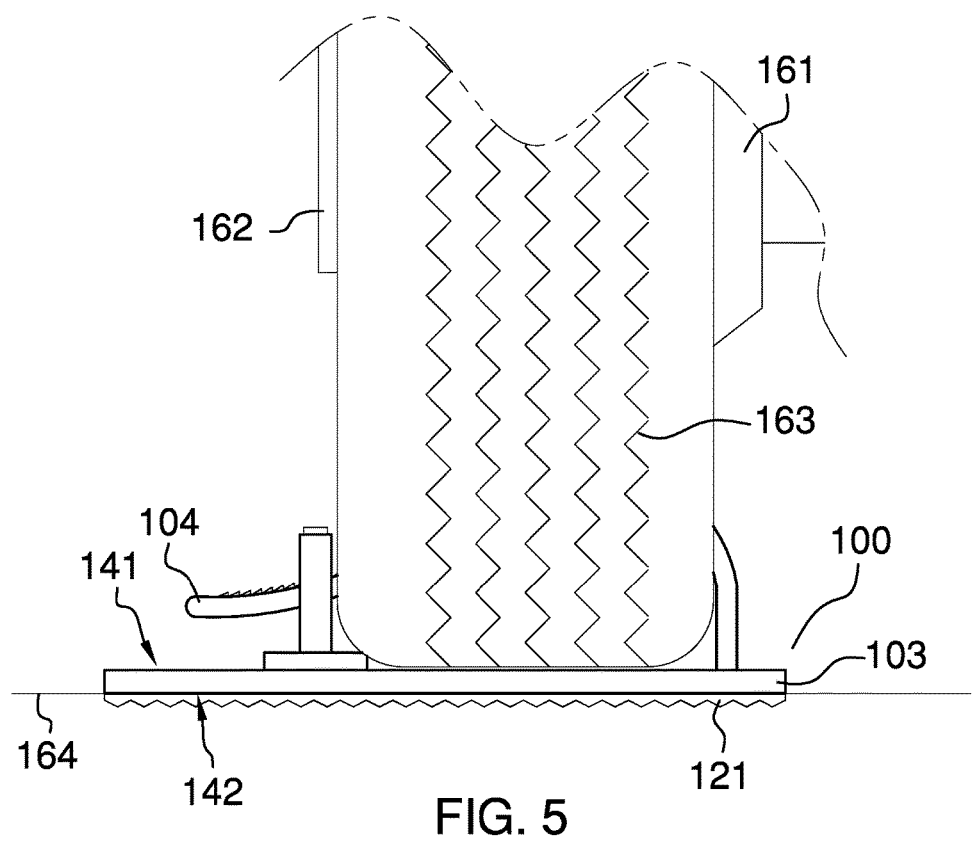
FIG. 5 is an in use view of an embodiment of the disclosure.
Figure 6:
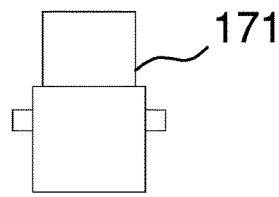
FIG. 6 is a detail view of an embodiment of the disclosure.
Figure 9:
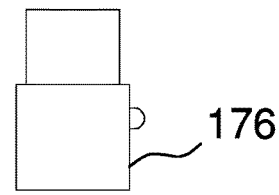
FIG. 9 is a detail view of an embodiment of the disclosure.
Figure 7:
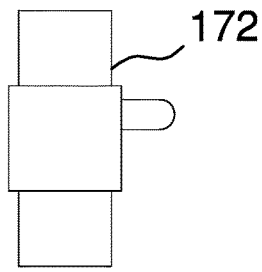
FIG. 7 is a detail view of an embodiment of the disclosure.
Figure 10:
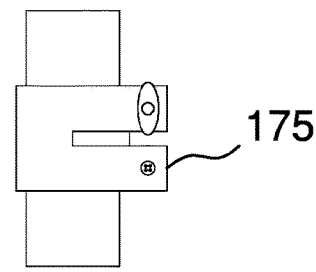
FIG. 10 is a detail view of an embodiment of the disclosure.
Figure 8:
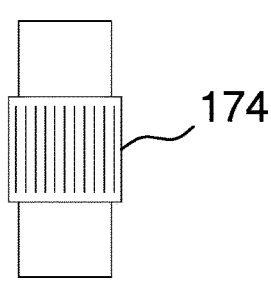
FIG. 8 is a detail view of an embodiment of the disclosure.
Figure 11:
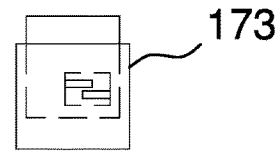
FIG. 11 is a detail view of an embodiment of the disclosure.

As shown most clearly in FIG. 5, the span of the distance from the center axis of the first stanchion 101 to the center axis of the second stanchion 102 is greater than the span of the distance between a first outer sidewall of the tire 163 and a second outer sidewall of the tire 163 such that the wheel 162 and tire 163 of the vehicle 161 can be positioned between the first stanchion 101 and the second stanchion 102 during use of the invention 100.

The base plate 103 is a rectangular block structure that increases the surface area of the load path relative to what is provided by the wheel 162 and tire 163 of the vehicle 161. The first stanchion 101, the second stanchion 102, and the strap 104 attach the base plate 103 to the wheel 162 and tire 163 of the vehicle 161. The base plate 103 is formed from a metal plate.

The base plate 103 further comprises a grip 121. The grip 121 is a faceplate that attaches to the distal surface 142 of the base plate 103. The grip 121 is a semi-rigid structure with an elastic nature. In the first potential embodiment of the disclosure, the grip 121 is formed with a plurality of pyramidal structures 122 that are arranged in a grid of rows and columns. The surfaces of each of the plurality of pyramidal structures 122 are used to further increase the overall surface area presented by the base plate 103 to the granular material that forms the supporting surface 164 upon which the vehicle 161 has been placed.

The strap 104 is a flexible structure that attaches the free end of the first stanchion 101 to the second stanchion 102 to form a loop. To attach the invention 100 to the wheel 162 and tire 163 of the vehicle 161, the strap 104 is inserted through an opening selected form the group consisting of: 1) the opening formed between two adjacent spokes of the wheel 162; or, 2) an opening between formed within the wheel disk of the wheel 162 before the second end 152 of the strap 104 attaches to the second stanchion 102.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Cable Tie: As used in this disclosure, a cable tie is a type of fastener that is used to tie two objects together. The cable tie has a box end and an open end. The box end further comprises a gear like structure wherein when the open end is inserted into the gear like structure, the gear like structure acts as a ratchet that prevents the open end from being removed from the gear like structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Correspond: As used in this disclosure, the term correspond is used as a comparison between two or more objects wherein one or more properties shared by the two or more objects match, agree, or align almost exactly.

Detent: As used in this disclosure, a detent is a device for attaching a first object to a second object in a detachable manner such that: 1) the position of the first object relative to the second object is adjustable; and, 2) the first object is attached to the second object in a detachable manner.

Distal: As used in this disclosure, the term distal is used to describe the relative location of two objects. The distal object is: 1) the object that is further from a previously specified center axis when the direction of comparison is the radial direction; and 2) the object that is further from a center point on a center axis when the direction of comparison is in the lateral direction.

Elastic: As used in this disclosure, an elastic is a material or object that deforms when a force is applied to it and that is able to return to its relaxed shape after the force is removed. A material that exhibits these qualities is also referred to as an elastomeric material.

Geometrically Similar: As used in this disclosure, geometrically similar is a term that compares a first object to a second object wherein: 1) the sides of the first object have a one to one correspondence to the sides of the second object; 2) wherein there is a proportional difference between each pair of corresponding sides is the same; 3) the angles formed by the first object have a one to one correspondence to the angles of the second object; and, 4) wherein the corresponding angles are equal.

Granular Material: As used in this disclosure, a granular material is a material that is formed from an accumulation of discrete particles. While the discrete particles of the granular material are solid materials, in aggregate the physical performance of granular material will exhibit fluid characteristics.

Inner Dimension: As used in this disclosure, the term inner dimension describes the span from a first inside or interior surface of a container to a second inside or interior surface of a container. The term is used in much the same way that a plumber would refer to the inner diameter of a pipe.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction.

One to One: When used in this disclosure, a one to one relationship means that a first element selected from first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Prism: As used in this disclosure, a prism is a 3 dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called that lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Rim: As used in this disclosure, a rim is the outer edge of a wheel where the tire is attached.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Stanchion: As used in this disclosure, a stanchion refers to a vertical pole, post, or support.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Telescopic: As used in this disclosure, telescopic is an adjective that describes an object made of sections that fit or slide into each other such that the object can be made longer or shorter by adjusting the relative positions of the sections.

Tire: As used in this disclosure, a tire is a solid or air filled covering for a wheel. The purpose of the tire is to absorb shocks, provide traction, and protect the wheel from wear and other damage.

Vehicle: As used in this disclosure, a motorized vehicle is a device that is used for transporting passengers, goods, or equipment. The term motorized vehicle refers to a vehicle can move under power provided by an electric motor or an internal combustion engine.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A non-skid device comprising
a first stanchion, a second stanchion, a base plate, and a strap;
wherein the non-skid device is configured for use with a vehicle;
wherein the vehicle is further defined with a wheel and a tire;
wherein the tire is further defined with a first outer sidewall and a second outer sidewall;
wherein the wheel is further defined with a wheel disk;
wherein the non-skid device is configured for use with the wheel and tire of the vehicle;
wherein the first stanchion, the second stanchion and the strap attach the base plate to the wheel and tire of the vehicle;
wherein the non-skid device increases the load bearing surface area relative to the surface area provided by the wheel and tire of the vehicle;
wherein the base plate is further defined with a medial surface and a distal surface;
wherein the strap is further defined with a first end and a second end;
wherein the first stanchion is a cantilever prism structure;
wherein the first stanchion projects perpendicularly away from the medial surface of the base plate;
wherein the first stanchion is further defined with a first fixed end and a first free end;
wherein the second stanchion is a cantilever prism structure;
wherein the second stanchion projects perpendicularly away from the medial surface of the base plate;
wherein the second stanchion is further defined with a second fixed end and a second free end;
wherein the first end of the strap permanently attaches to the free end of the first stanchion;
wherein the second end of the strap removably attaches to the second stanchion;
wherein the second stanchion is a telescopic structure;
wherein the span of the length of the second stanchion from the fixed end attached to the base plate to the free end of the second stanchion is adjustable;
wherein the second stanchion comprises a first arm, a second arm, a ratchet, and a detent;
wherein the detent connects the second arm to the first arm;
wherein the first arm is a hollow first prism that is further defined with an inner dimension;
wherein the second arm is a second prism that is further defined with an outer dimension;
wherein the first arm and the second arm are geometrically similar.

2. The non-skid device according to claim 1 wherein the first arm is the arm of the second stanchion that attaches to the medial surface of the base plate.

3. The non-skid device according to claim 2
wherein the outer dimension of the second arm is less than the inner dimension of the first arm such that the second arm can be inserted into the first arm in a telescopic manner;
wherein span of the second stanchion from the second fixed end to the second free end is adjusted by adjusting the relative position of the second arm within the first arm.

4. The non-skid device according to claim 3
wherein the detent is a mechanical device that connects and secures the first arm to the second arm;
wherein the position of the second arm relative to the first arm is held in position using the detent.

5. The non-skid device according to claim 4
wherein the ratchet is a mechanical device;
wherein the ratchet removably attaches the second end of the strap to the second arm of the second stanchion.

6. The non-skid device according to claim 5
wherein the ratchet engages with the second end of the strap such that the strap will only move in one direction though the ratchet;
wherein the tension applied to the strap by the ratchet is adjustable.

7. The non-skid device according to claim 6 wherein the angle of attachment of the strap to the ratchet is adjustable.

8. The non-skid device according to claim 7
wherein the ratchet comprises a pawl, a gear box, and a quick release;
wherein the pawl inserts into the gear box;
wherein the quick release releases the pawl from the gear box.

9. The non-skid device according to claim 8
wherein the pawl comprises a plurality of angled teeth;
wherein the pawl is formed on the second end of the strap.

10. The non-skid device according to claim 9
wherein the gear box is a channel that is formed through the second arm of the second stanchion;
wherein the gear box is further fitted with a plurality of sloped teeth that are designed to engage with the pawl of the strap when the strap is inserted into the gear box;
wherein the inner dimensions of the gear box is adjustable.

11. The non-skid device according to claim 10
wherein the pawl of the strap is inserted into the gear box such that the angled teeth of the pawl engage the sloping teeth contained within the gear box;
wherein the angled teeth of the pawl interact with the sloped teeth of the gear box such that the strap can only move in one direction through the gear box.

12. The non-skid device according to claim 11
wherein the quick release releases the pawl of the strap from the gear box;
until the strap is released by the quick release;
wherein the quick release is a lever mechanism;
wherein the quick release reversibly increases the inner dimensions of the gear box.

13. The non-skid device according to claim 12 wherein the span of the distance from the center axis of the first stanchion to the center axis of the second stanchion is greater than the span of the distance between the first outer sidewall of the tire and the second outer sidewall of the tire such.

14. The non-skid device according to claim 13
wherein the base plate is a rectangular block structure;
wherein the base plate is formed from a metal plate;
wherein the base plate further comprises a grip;
wherein the grip is a faceplate;
wherein the grip attaches to the distal surface of the base plate;
wherein the grip is a semi-rigid structure with an elastic nature.

15. The non-skid device according to claim 14 wherein the grip is formed with a plurality of pyramidal structures that are arranged in a grid of rows and columns.

16. The non-skid device according to claim 15
wherein the strap is a flexible structure;
wherein the strap attaches the free end of the first stanchion to the second stanchion to form a loop.

17. The non-skid device according to claim 16 wherein the strap is inserted through an opening formed within the wheel disk of the wheel before the second end of the strap attaches to the second stanchion.

* * * * *